US010761999B1

(12) United States Patent
Harari Shechter et al.

(10) Patent No.: US 10,761,999 B1
(45) Date of Patent: Sep. 1, 2020

(54) STORAGE DEVICE WITH PREDICTOR ENGINE OF HOST TURNAROUND TIME

(71) Applicant: Western Digital Technologies, Inc., San Jose, CA (US)

(72) Inventors: Noga Harari Shechter, Beer-Sheva (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/427,076

(22) Filed: May 30, 2019

(51) Int. Cl.
*G06F 12/1081* (2016.01)
*H04L 9/32* (2006.01)

(52) U.S. Cl.
CPC ............ *G06F 12/1081* (2013.01); *H04L 9/32* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 5,530,901 | A * | 6/1996 | Nitta ................... | H04N 1/32358 710/28 |
| 6,721,820 | B2 | 4/2004 | Zilberman et al. | |
| 8,335,576 | B1 * | 12/2012 | Bradshaw ............... | H04L 65/80 700/94 |
| 2006/0053236 | A1 * | 3/2006 | Sonksen ................ | G06F 13/28 710/22 |
| 2007/0162642 | A1 * | 7/2007 | Tousek .................... | G06F 13/28 710/22 |
| 2007/0271442 | A1 * | 11/2007 | Shaw ..................... | G09G 5/393 712/202 |
| 2013/0262732 | A1 * | 10/2013 | Tanabata ................. | G06F 13/36 710/308 |
| 2015/0058596 | A1 * | 2/2015 | King .................... | G06F 12/1081 711/206 |
| 2016/0210167 | A1 * | 7/2016 | Bolic ................... | G06F 9/45558 |
| 2017/0199668 | A1 | 7/2017 | Ouyang et al. | |
| 2017/0315943 | A1 | 11/2017 | Benisty et al. | |

FOREIGN PATENT DOCUMENTS

| | | |
|---|---|---|
| EP | 1156422 A2 | 11/2001 |
| EP | 2036090 B1 | 11/2011 |

OTHER PUBLICATIONS

International Search Report and Written Opinion issued in corresponding International Application No. PCT/US2019/067229, dated Mar. 10, 2020 (9 pages).

* cited by examiner

*Primary Examiner* — Nicholas J Simonetti
(74) *Attorney, Agent, or Firm* — Patterson & Sheridan, LLP; Steven H. Versteeg

(57) ABSTRACT

A method of accessing data by a storage device includes issuing a DMA read request of a host memory to a host. A host turnaround time is estimated. The host turnaround time is a time interval between when the DMA read request is issued and when an initial data packet of requested data from the host from the DMA read request arrives to the storage device. A data-path of the storage device is initialized to transfer the requested data of the DMA read request to a device buffer of the storage device. Initialization of the data-path is started after issuance of the DMA read request and is completed at an end of the estimated host turnaround time. The requested data is received from the host. The received requested data is transferred utilizing the data-path to the device buffer.

20 Claims, 5 Drawing Sheets

STORAGE DEVICE WITH PREDICTOR ENGINE OF HOST TURNAROUND TIME

BACKGROUND OF THE DISCLOSURE

Field of the Disclosure

Embodiments generally relate to methods and apparatuses of a storage device with non-volatile memory accessing a host memory of a host.

Description of the Related Art

NVM Express (NVMe) is a register level interface protocol for communication between a software application of a host and a non-volatile memory of a storage device. The NVMe logic includes a direct memory access (DMA) block that allows the storage device access to the main system memory of the host. A DMA read operation refers to a data read from the host main memory and written to a storage device, and a DMA write operation refers to a data fetched from a storage device and written to a host. For example, a DMA read operation may be performed to fetch data read from a submission queue within the host main memory.

In a DMA read operation, a host turnaround time refers to a time interval from when a storage device sends a read data request to the host until the data arrives from the host to the storage device. A data-path of the storage device is activated to start the data transfer from the received data from the host to a device buffer of the storage device. The data is transferred from the device buffer to the non-volatile memory of the storage device. A latency time from initialization of the data-path to activation of the data-path causes degraded performance or degraded efficiency of the storage device.

Therefore, there is a need for improved storage devices and methods for accessing data by a storage device.

SUMMARY OF THE DISCLOSURE

In one embodiment, a method of accessing data by a storage device includes issuing a direct memory access (DMA) read request of a host memory to a host. A data-path of the storage device is initialized to transfer requested data of the DMA read request to a device buffer of the storage device. Initialization of the data-path is started after issuance of the DMA read request and prior to receipt of an initial data packet of the received requested data. The requested data is received from the host. The received requested data is transferred utilizing the data-path to the device buffer of the storage device.

In another embodiment, a method of accessing data by a storage device includes issuing a DMA read request of a host memory to a host. A host turnaround time is estimated. The host turnaround time is a time interval between when the DMA read request is issued and when an initial data packet of requested data from the host from the DMA read request arrives to the storage device. A data-path of the storage device is initialized to transfer the requested data of the DMA read request to a device buffer of the storage device. Initialization of the data-path is started after issuance of the DMA read request and is completed at an end of the estimated host turnaround time. The requested data is received from the host. The received requested data is transferred utilizing the data-path to the device buffer.

In one embodiment, a storage device includes a non-volatile memory and a device controller. The device controller includes a host interface, a data-path, a counter, a statistic collector, and a predictor engine means. The data-path includes a DMA module and a device buffer. The device controller operable to issue a DMA read request of a host memory to a host by the DMA module, count an actual host turnaround time of the DMA read request by the counter, collect one or more parameters related to the DMA read request by the statistic collector, estimate an estimated host turnaround time by the predictor engine means, and initialize the data-path of the storage device to transfer the requested data of the DMA read request to the device buffer. Initialization of the data-path is started after issuance of the DMA read request and is completed proximate at an end of the host turnaround time. The requested data is received from the host. The received requested data is transferred utilizing the data-path to the device buffer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments relate to methods and apparatuses of a storage device with non-volatile memory accessing a host memory of a host. The storage device can access the host memory through a direct memory access (DMA) read request. High performance and high efficiency of the storage device during a DMA read request operation is provided.

Figure 1:
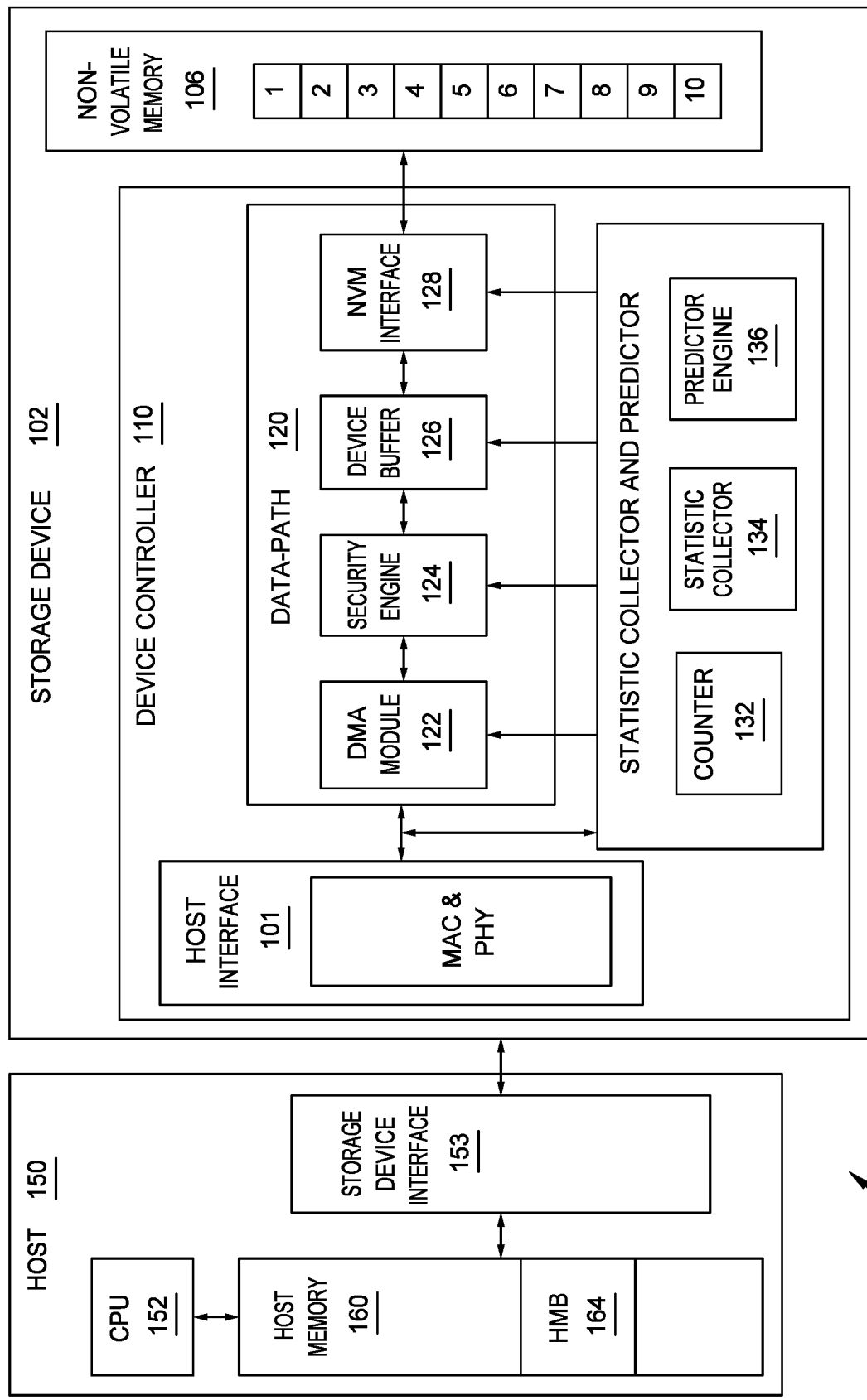
FIG. 1 is a schematic illustration of one embodiment of a system including a host connected to a storage device.

FIG. 1 is a schematic illustration of one embodiment of a system 100 including a host 150 connected to a storage device 102, such as a solid state drive (SSD), for the host 150. The system 100 may also include a switch or a bridge connecting the host 150 and the storage device 102.

Host 150 may utilize a non-volatile memory (NVM) 106 included in storage device 102 to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 102 may take the form of an embedded mass storage device, such as an eSD/eMMC embedded flash drive, embedded in host 150. Storage device 102 may also be any other type of internal storage device, removable storage device, embedded storage device, external storage device, or network storage device.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 150 includes a central processing unit (CPU) 152 connected to a host memory space 160, such as DRAM or other main memories. An application program may be stored to memory space 160 for execution by components of host 150. Host memory space 160 may include host queues 162, such as command submission queues and command completion queues. Host memory space 160 may include data buffers, such as a host memory buffer 164 for use by the storage device 102.

Storage device 102 including a host interface 101 for communications between a storage device interface 153 of the host 150. The host interface 101 and the storage device interface 153 operate under a communication protocol, such as a Peripheral Component Interface Express (PCIe), a serial advanced technology attachment (SATA), serial attached SCSI (SAS), universal flash storage (UFS), and other suitable serial communication protocols. A link between the storage device 102 and the host 150 may be any appropriate corresponding link, such as a PCIe link, a SATA link, a SAS link, or a UFS link. The link may be one to thirty-two lanes, depending on the number of available phys connecting the storage device 102 and the host 150. The link and the number of lanes are typically set during initialization of the storage device 102.

NVM 106 of storage device 102 is configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device 102 includes a device controller 110 which manages operations of storage device 102, such as writes to and reads from NVM 106. Device controller 110 may include one or more processors, which may be multi-core processors. Device controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command submission queue and command completion queue for transferring data between storage device 102 and host 150. Command submission queues and command completion queue are typically stored in host memory 160. Commands, such as read commands and write commands, are placed by host software into the submission queue and are fetched by the storage device for execution. Completions are placed into the associated completion queue by storage device controller to notify the host of completion of the commands.

Device controller 110 includes a data-path 120. The data-path 120 includes a direct memory access module 122, a security engine 124, a device buffer 126, and a non-volatile memory (NVM) interface 128. The direct memory access module 122 can access the host memory 160 without involvement from the CPU 152 of the host 150 to perform read and write operations to the host memory 160. The security engine 124 protects data transfer through encrypting data to be written to the NVM 106, decrypting data read from the NVM 106, parity checks, and/or other data protection mechanisms. Encryption and decryption of data involves coding and decoding processes that may involve multiple iterations during coding and decoding. The device buffer 126 is for short-term storage or temporary memory during operation of storage device 102. The device buffer 126 may include dynamic random access memories (DRAM), static random access memories (SRAM), and other forms of volatile memories. The device buffer 126 is used to cache data to be written to and read from the non-volatile memory through the NVM interface 128. The device buffer 126 can also be used to store metadata, such as flash translation layer tables.

Storage device 102 includes a counter 132, a statistic collector 134, and a predictor engine 136. The counter 132 measures an actual host turnaround time from issuance of a DMA read request by the storage device 102 to receipt of an initial data packet of the requested data by the host interface 101. The statistic collector 134 collects statistic information regarding the parameters of DMA read request operations.

The statistic collector 134 can collect one or more of the following parameters: an average host turnaround time, a networking fabric structure interfacing a host and a storage device, a host-storage device interface type, a host-storage device communications protocol type, a host interface speed of a storage device, a number of lanes of a link between a host and a storage device, packets size of a transaction, current stress across the link between the host and the storage device, other suitable parameters, and combinations thereof.

A predictor engine 136 uses the collected statistic information of the statistic collector 134 to estimate an estimated host turnaround time from issuance of a DMA read request by the storage device 102 to estimated receipt of an initial data packet of the requested data by the host interface 101. The estimated host turnaround time is used by the device controller 110 to initialize the data-path 120 after a DMA read request is issued by the DMA module 122 and before the receipt of the initial data packet of the requested data. Initialization of the data-path 120 at this time reduces the lag time between completion of initialization of the data-path 120 and receipt of the initial data packet of the request data and allows the data-path 120 to be used on other operations and on other threads prior to initialization of the data-path for the DMA read request. For example, the data-path 120 can be used for host memory buffer operations to the host memory buffer 164. In another example, the data-path 120 can be used for security operations of the security engine 124. For instance, the security engine 124 can perform an encoding operation of data read from host 150 to be transferred to NVM 106.

Device controller 110 executes computer-readable program code (e.g., software or firmware) executable instructions (herein referred to as "instructions"). The instructions may be executed by various components of controller 110, such as processor, logic gates, switches, application specific integrated circuits (ASICs), programmable logic controllers, embedded microcontrollers, and other components of controller 110.

The instructions are stored in a non-transitory computer readable storage medium. In certain embodiments, the instructions are stored in a non-transitory computer readable storage medium of storage device 102, such as in a read-only memory or NVM 106. Instructions stored in storage device 102 may be executed without added input or directions from host 150. In other embodiments, the instructions are transmitted from host 150. The controller 110 is configured with hardware and instructions to perform the various functions described herein and shown in the figures.

Figure 2A:
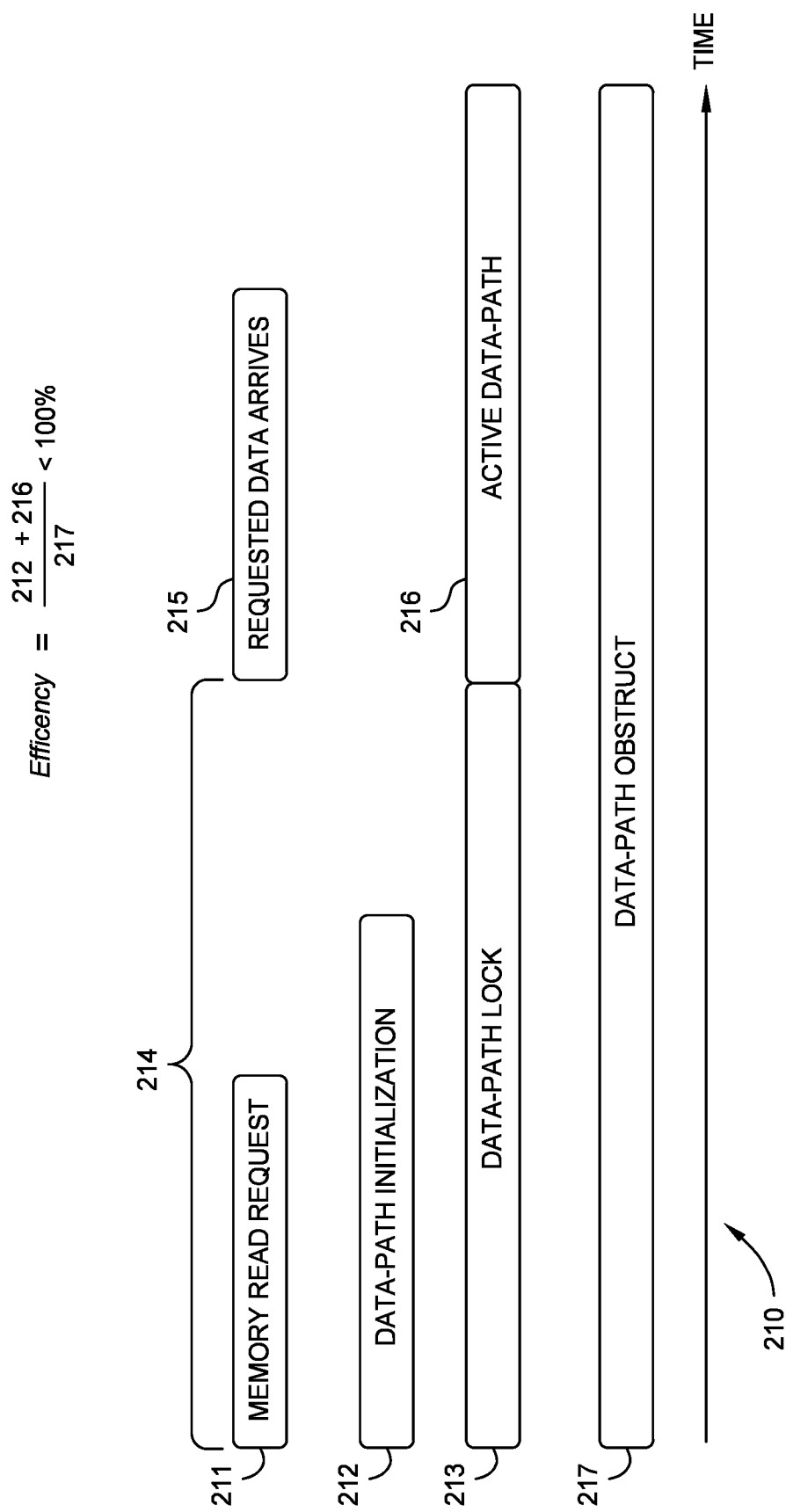
FIG. 2A illustrates time intervals of one method of initializing a data-path of a storage device for a DMA read request by a storage device to a host, in which the data-path is initialized when a DMA read request is issued to the host.

FIG. 2A illustrates time intervals of one method 210 of initializing a data-path of a storage device for a DMA read request by a storage device to a host, such as storage device 102 issuing a DMA read request to host 150 of FIG. 1 or other suitable storage devices. The method 210 initializes the data-path when issuing a DMA read request to the host.

The method 210 starts by issuing a DMA read request 211 to the host. Internal data-path initialization 212 of the storage device is started at the moment a DMA read request 211 is issued by the storage device to the host. During the time interval of the internal data-path initialization 212, a data-path lock 213 occurs for a time interval in which data-path engines are locked until a requested data 215 from the host arrives to the storage device. When the requested data 215 from the host arrives to the storage device, the data-path is unlocked and becomes an active data-path 216 to process and transfer the received data, such as encrypting the requested data and transferring the data to a device buffer. The storage device waits a host turnaround time 214 from issuance of the DMA read request 211 to receipt of the requested data 215 to process and transfer the received data by the active data-path 216. During the time interval of the data-path lock 213 and the active data-path 216, a data-path obstruct 217 occurs where the data-path cannot be used by other components or other threads of the storage device. For example, during the data-path obstruct 217, the data-path is obstructed from host memory buffer transfers or internal security operations of the storage device. The data-path, such as the data-path 120 of FIG. 1, operates in a pipeline architecture in which data values of an operation are propagated forward. The data-path can handle multiple operations at different stages of the pipeline. When the data-path obstruct 217 occurs, components of the data-path, such as an address register and a control register, handling processing and transferring of the requested data 215 cannot be inputted with other operations into the pipeline of the data-path.

The method 210 provides high performance but low efficiency of the storage device. Performance is the amount of data over time from the host interface through the data-path to a device buffer from a DMA read request. Efficiency is utilization of the data-path for the DMA read request thread as well as other threads. High performance is provided since internal data-path engines are initialized in advanced and waiting for the requested data. Once the requested data arrives, data-path engines start processing the requested data with little or no latency. Low efficiency during the data-path obstruct 217 is provided since the internal data-path engines cannot do any other tasks during the data-path lock 213 and the active data-path 216. Internal data-path efficiency is the time interval of the sum of data-path initialization 212 and the active data-path 216 divided by the data-path obstruct 217. The internal data-path efficiency of method 210 is low since it is a function of the host turnaround time 214.

Figure 2B:
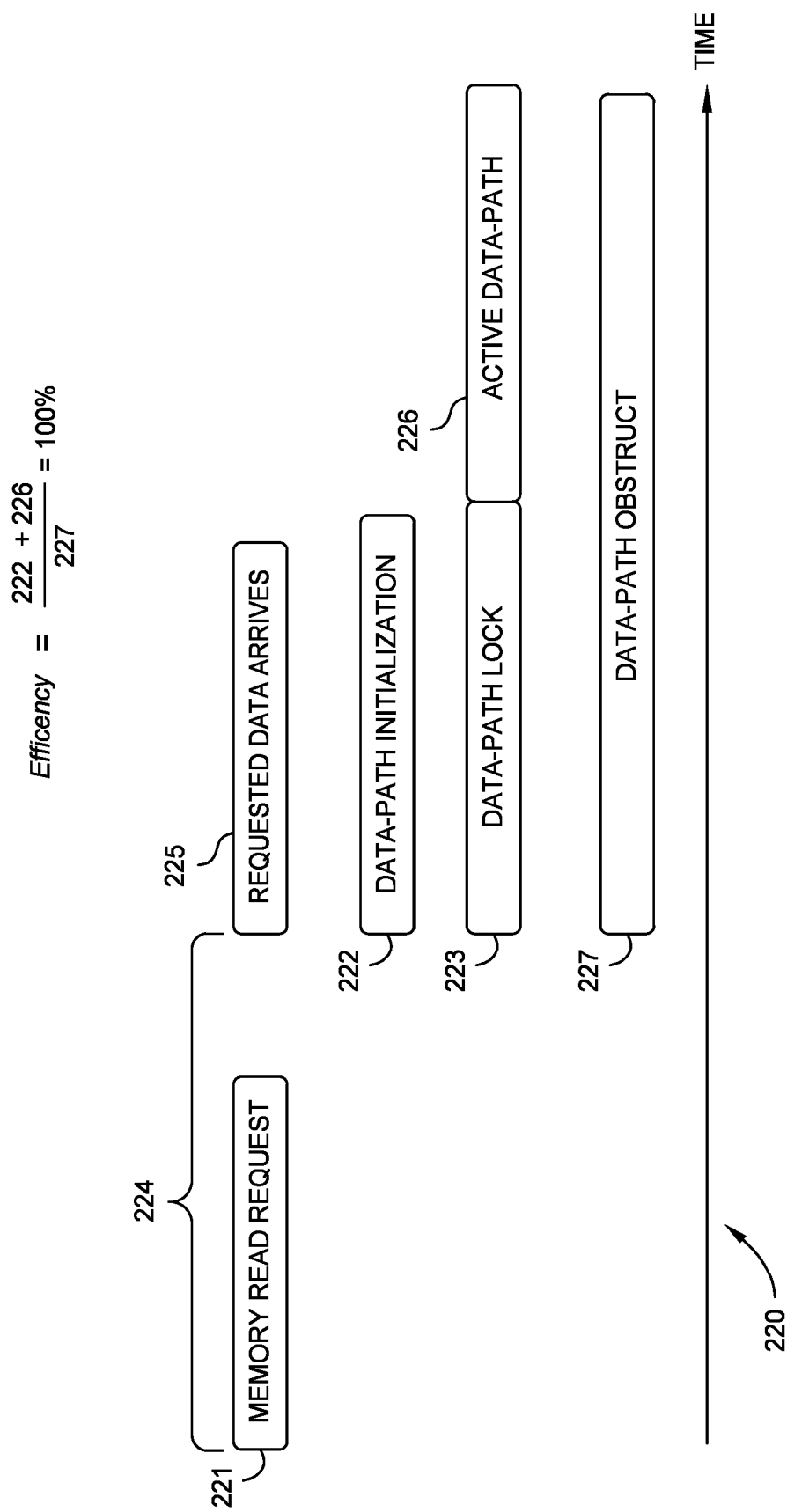
FIG. 2B illustrates time intervals of another method of initializing a data-path of a storage device for a DMA read request by a storage device to a host, in which the data-path is initialized once an initial packet of the requested data arrives to the storage device.

FIG. 2B illustrates time intervals of another method 220 of initializing a data-path of a storage device for a DMA read request by a storage device to a host, such as storage device 102 issuing a DMA read request to host 150 of FIG. 1 or other suitable storage devices. The method 220 initializes the data-path once an initial packet of the requested data arrives to the storage device.

The method 220 starts by issuing a DMA read request 221 to the host. Internal data-path initialization 222 of the storage device is started at the moment a requested data 225 from the host arrives to the storage device. During the time interval of the internal data-path initialization 222, a data-path lock 223 occurs. Upon completion of the internal data-path initialization 222, the data-path is unlocked and becomes an active data-path 226 to process and transfer the received data, such as encrypting the requested data and transferring the data to a device buffer. The storage device waits a host turnaround time 224 from issuance of the DMA read request 221 to receipt of the requested data 225 to start data-path initialization 222. After completion of the data-path initialization 222, the active data-path 226 processes and transfers the received data. During the time interval of the data-path lock 223 and the active data-path 226, a data-path obstruct 227 occurs where the data-path cannot be used by other components or other threads of the storage device. For example, during the data-path obstruct 227, the data-path is obstructed from host memory buffer transfers and internal security operations of the storage device.

The method 220 provides high efficiency but low performance of the storage device. High efficiency during the data-path obstruct 227 is provided since the time interval of the data-path lock 223 is short and is only the time required to complete data-path initialization 222. Internal data-path efficiency is the time interval of the sum of data-path initialization 222 and the active data-path 226 divided by the data-path obstruct 227. The internal data-path efficiency of method 220 is near or at 100% since it is not a function of the host turnaround time 224. Low performance is provided since the internal data-path is not ready when the requested data arrives 222. Instead, the storage drive must wait the time interval of completion of the data-path initialization 222 for the active data-path 226 to begin processing and transferring the requested data 225.

Figure 2C:
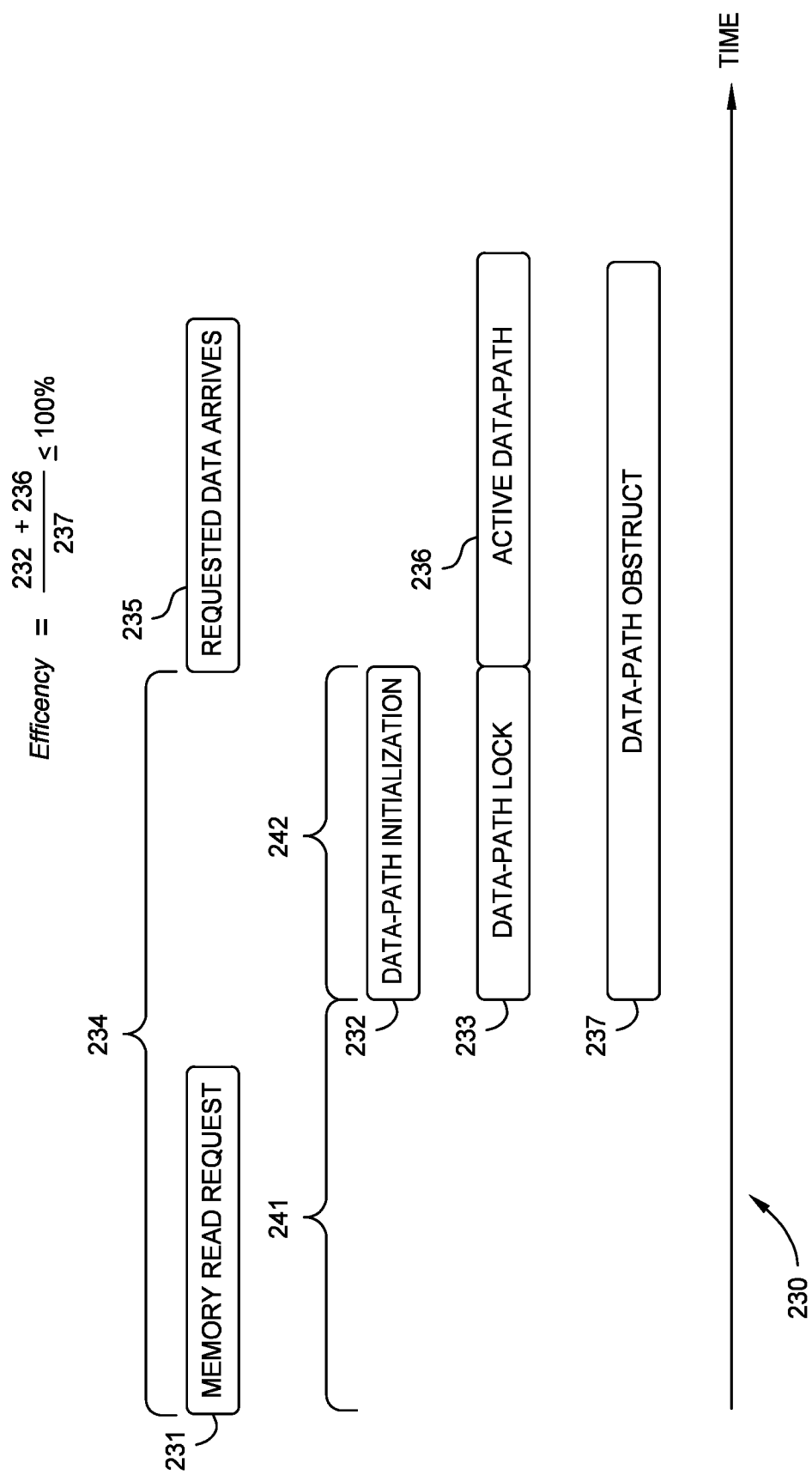
FIG. 2C illustrates time intervals of still another method of initializing a data-path of a storage device for a DMA read request by a storage device to a host, in which the data-path is initialized utilizing an estimated host turnaround time.

FIG. 2C illustrates time intervals of still another method 230 of initializing a data-path of a storage device for a DMA read request by a storage device to a host, such as storage device 102 issuing a DMA read request to host 150 of FIG. 1 or other suitable storage devices. The method 230 utilizes an estimated host turnaround time to start initialization of the data-path after a DMA read request is issued by the storage device and before an initial data packet of the requested data is received by the storage device.

The method 230 starts by issuing a DMA read request 231 to the host. Internal data-path initialization 232 of the storage device is started after a first time interval 241 greater than zero from the read request 231 is issued and prior to a second time interval 242 greater than zero from receipt of a requested data 235 from the host by the storage device. During the time interval of the internal data-path initialization 232, a data-path lock 233 occurs. The storage device starts the data-path initialization 232 utilizing an estimate for a host turnaround time 234 from issuance of the DMA read request 231 to receipt of the requested data 235. The storage device waits the first time interval 241 after the read request 231 is issued so that the completion of the data-path initialization 232 occurs proximate to when the requested data 235 is received by the storage device. Data-path initialization 232 for the DMA read request can involve initializing internal addresses, data sizes, encryption keys, data vectors, other components, and combinations thereof.

When the requested data 235 from the host arrives to the storage device, the data-path is unlocked and becomes an active data-path 236 to process and transfer the received data, such as encrypting the requested data and transferring the data to a device buffer. The active data-path 236 occurs with little or no time lag between the completion of the data-path initialization 232 and receipt of the requested data 235. During the time interval of the data-path lock 233 and the active data-path 236, a data-path obstruct 237 occurs where the data-path cannot be used by other components or other threads of the storage device. For example, during the data-path obstruct 237, the data-path is obstructed from host memory buffer transfers and internal security operations of the storage device. Shortening the data-path obstruct 237 by shortening the data-path lock 233 allows that data-path to be inputted with other operations to flow through the pipeline increasing the overall data-path throughput.

The method 230 provides high performance and high efficiency. High performance is provided since the data-path initialization 232 is completed proximate to when the requested data arrives 235. There is little or no time lag from the data-path to begin processing and transferring of the requested data 235. High efficiency during the data-path obstruct 237 is provided since the time interval of the data-path lock 233 is short and is about the time required to complete data-path initialization 232. Internal data-path efficiency is the time interval of the sum of data-path initialization 232 and the active data-path 236 divided by the data-path obstruct 237. The internal data-path efficiency of method 230 can be near or at 100% by having the data-path initialization 232 complete at or near the end of the host turnaround time 234. Having the time interval of the data-path lock 233 similar to the time interval of the data-path initialization 232 reduces the time interval of the data-path obstruct 237.

A device controller of the storage device can include a counter to measure a host turnaround from issuance of a DMA read request from the storage device and receipt of the requested data from the host. A device controller of the storage device can include a statistic collector collecting parameters of historical completed DMA read request operations. The statistic collector can collect one or more of the following parameters: an average host turnaround time, a networking fabric structure interfacing a host and a storage device, a host-storage device interface type, a host-storage device communications protocol type, a host interface speed of a storage device, a number of lanes of a link between a host and a storage device, packets size of a transaction, current stress across the link between the host and the storage device, other suitable parameters, and combinations thereof.

A device controller of the storage device can include a predictor engine to determine when to start initialization of the data-path 236. The predictor engine can refer to the one or more parameters collected by the statistic collector. In one embodiment, the predictor engine uses an average turnaround time based upon the current operation mode of the device controller. The current operation mode can include one or more of the following parameters: a networking fabric structure interfacing a host and a storage device, a host-storage device interface type, a host-storage device communications protocol type, a host interface speed of a storage device, a number of lanes of a link between a host and a storage device, packets size of a transaction, current stress across the link between the host and the storage device, other suitable parameters, and combinations thereof.

The networking fabric structure interfacing the host and the storage device details the topology connecting the host and the storage device, such as the network nodes, switches, and bridges connecting the host and the storage device. A certain host interface can be associated with a certain data rate transmission. For example, in PCIe interface, each generation (i.e., Gen1, Gen2, Gen3, Gen4 and Gen5) of the PCIe interface can be associated with a certain speed. A number of lanes of a link between a host interface and storage device interface can be associated with a certain speed. For example, in a PCIe interface, the number of serial lanes can be 1, 2, 4, 8, 16 or 32. The greater the number of lanes corresponds to a greater rate of data transmission. A packets size describes a packet size of the read request and the size of payload of the requested data in one or more data packets. Typically, a large packet size can be associated with a longer host turnaround time in comparison to a small packet size. Current outstanding commands describes the number of other outstanding commands on the link between host interface and the storage device interface. For example, if there are a large number of other outstanding commands, than the completion commands of these other outstanding commands across the link may increase the host turnaround time for the requested data of a DMA read request due to the increased stress, traffic, or data across the link. The one or more parameters of the operation mode of the storage controller can be associated with an average host turnaround time which is regularly updated by the statistic collector based upon collected parameters of completed transactions.

Across resets or power downs of the storage device, the statistic collector can store the collected data of the collected parameters in non-volatile memory so that the predictor engine may use the stored statistical data across resets or power down. In other modes, the statistic collector may start at a zero state across resets or power downs and update the state during operation of the storage device. In other modes, the statistic collector may start at a factory or user inputted state across resets or power downs and update the initial state with collected parameters of completed transactions during operation of the storage device.

The predictor engine utilizes the collected parameters from the statistic collector to estimate when an initial packet of a requested read data will arrive to the storage device. The device controller of the storage device starts initializing the data-path prior to the estimated requested data arrival time. In certain embodiments, the device controller of the storage device uses the estimated time to determine a time to start data-path initialization 232 so that completion of the data-path initialization corresponds to when an initial packet of a requested read data arrives to the storage device.

The method 230 provides high efficiency of a data-path since the data-path can be used in other components and other threads separate from the DMA read request 231. For example, the data-path can be used in a host memory buffer transfers between a host memory buffer of the host and the storage device. A security engine of the data-path can decrypt data from a NVM of the storage device for storing to the host memory buffer. In another example, the data-path can be used in an internal security operation of the storage device. The security engine requires time to initialize for each thread due to special keys required for encryption and decryption of data.

In other embodiments, the predictor engine may use machining learning instead of the estimated host turnaround time to start initialization of the data-path so that initialization of the data-path completes proximate to the receipt of the requested data.

Figure 3:
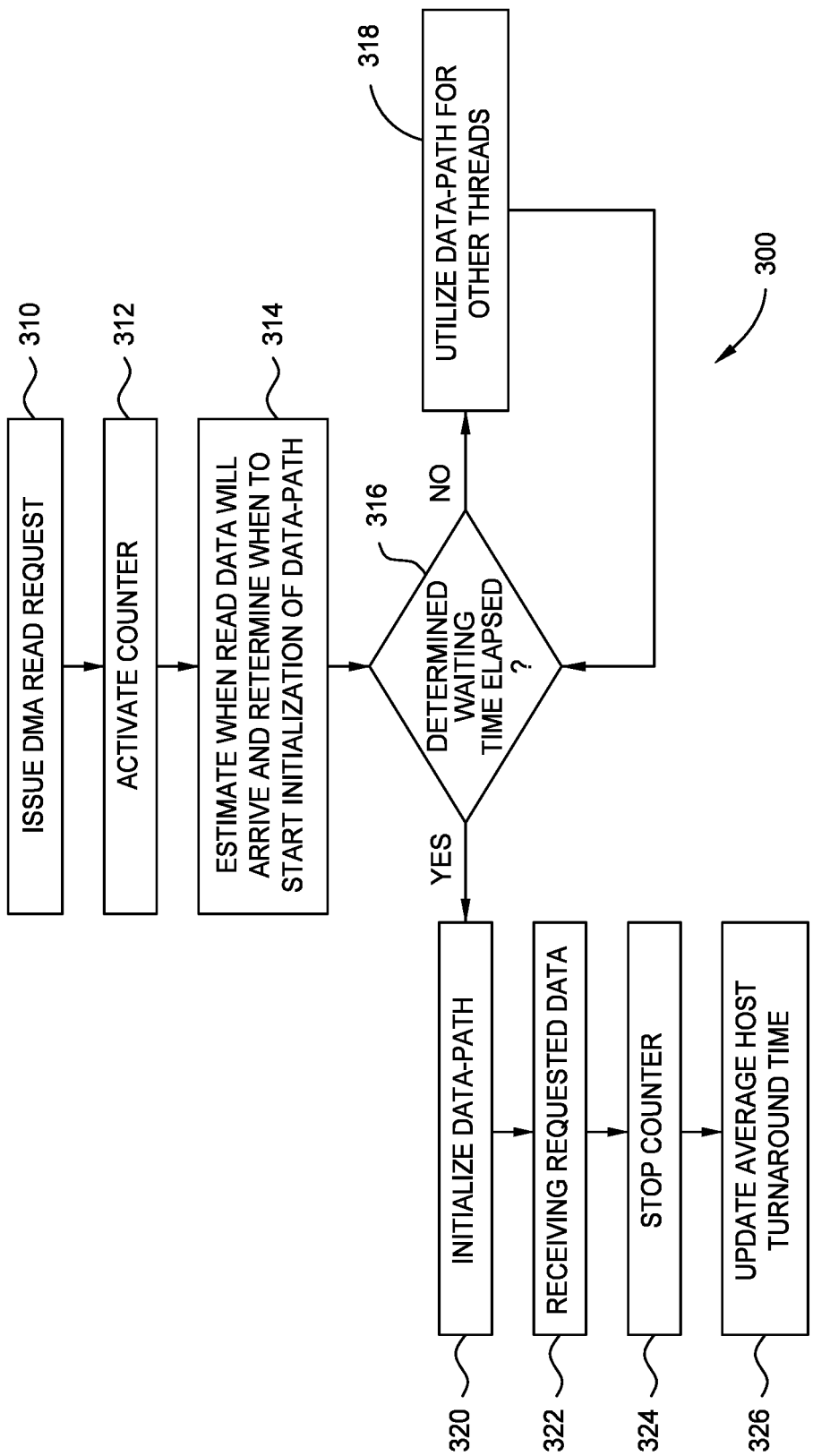
FIG. 3 is a schematic diagram of certain embodiments of a method of estimating when to initialize a data-path of a storage device.

FIG. 3 is a schematic diagram of certain embodiments of a method 300 of estimating when to initialize a data-path of a storage device, such as data-path 120 of storage device of FIG. 1 or other suitable data-paths. At block 310, the storage device issues a DMA read request to the host. At block 312, a counter of the storage device is activated to determine the time from issuance of the DMA read request to receipt of the requested data by the storage device from the host. The counter may be the same counter as used by a completion timeout mechanism of the DMA read request.

At block 314, a predictor engine of the storage device estimates a host turnaround time when an initial data packet of the requested data will arrive on the host interface and when to initialize the data-path so that completion of the data-path initialization corresponds to when the initial data packet arrives. For example, an estimated host turnaround time minus the data-path initialization time can be used as the time interval to start the data-path initialization for the DMA read request of block 310. The predictor engine may utilize one or more parameters relating to the host turnaround time to determine an estimated host turnaround time. For example, the parameters can include an networking fabric structure, a host-storage device interface type, a host-storage device communications protocol type, a host interface speed, a number of lanes of a link between the host and the storage device, packets size of the DMA request, current stress across the link between the host and the storage device, an average host turnaround time of prior transactions, and combinations thereof. A statistic collector may collect the one or more parameters for use by the predictor engine. An average host turnaround for a mode of the storage device can be determined by the statistic collector At block 316, the storage device waits the determined time of block 314. If the determined waiting time has not yet elapsed, the storage device utilizes the data-path for one or more other threads at block 318. In certain embodiments, the device controller determines whether the operation of the other thread(s) can be executed or not with the time interval of block 316. If the operation of the other thread(s) cannot be executed prior to the estimated time of receipt of the requested data from the DMA read request, the operation of the other thread(s) on the data-path is postponed.

If the determined waiting time has elapsed, the storage device initializes the data-path at block 320. At block 322, the requested data is received by the storage device. If the predictor engine accurately estimates the host turnaround time, data-path initialization will complete proximate to when the requested data arrives to the storage device at block 322. If the data-path initialization is completed slightly before of slightly after the arrival of the initial data packet of the request, the overall efficiency is still high since a time lag between completion of the data-path initialization and receipt of an initial data packet of requested data is reduced in comparison to method 210.

In certain embodiments, if the predictor engine inaccurately estimates the host turnaround and the storage device is still waiting to initialize the data-path when an initial data packet of the requested data arrives. The storage device can immediately start initializing the data-path upon receipt of the initial data packet of the requested data without waiting the full amount of time at block 316 as determined by the predictor engine at block 314.

Once the initial data packet of the requested data arrives at block 322, the activated counter of block 312 is stopped. The elapsed time of the counter represents the actual host turnaround time. The actual host turnaround time from block 324 is used to update the statistic collector at block 326 with an updated average host turnaround time. One or more blocks of method 300 can be performed in other orders, can be performed concurrently, can be performed in parallel, and/or can be omitted.

FIG. 3 illustrates just one embodiment of one sequence of the blocks of the method 300 of estimating when to initialize the data-path of the storage device. In other embodiments of the method 300, one or more blocks can be deleted, can be added, and/or can be performed in other sequences.

Embodiments relate to methods and apparatuses of a storage device with non-volatile memory accessing a host memory of a host. The storage device can access the host memory through a direct memory access (DMA) read request. High performance and high efficiency of the storage device during a DMA read request operation is provided. In certain embodiments, high performance is provided by completing initialization of a data-path proximate to when the requested data of the DMA read request arrives. There is little or no time lag from the data-path to begin processing and transferring of the requested data. In certain embodiments, high efficiency is provided since the time interval of when a data-path lock for the DMA read request is short and is about the time required to complete data-path initialization. Other threads can be performed by the data-path prior to data-path initialization for the DMA read request.

In one embodiment, a method of accessing data by a storage device includes issuing a direct memory access (DMA) read request of a host memory to a host. A data-path of the storage device is initialized to transfer requested data of the DMA read request to a device buffer of the storage device. Initialization of the data-path is started after issuance of the DMA read request and prior to receipt of an initial data packet of the received requested data. The requested data is received from the host. The received requested data is transferred utilizing the data-path to the device buffer of the storage device, In another embodiment, a method of accessing data by a storage device includes issuing a DMA read request of a host memory to a host. A host turnaround time is estimated. The host turnaround time is a time interval between when the DMA read request is issued and when an initial data packet of requested data from the host from the DMA read request arrives to the storage device. A data-path of the storage device is initialized to transfer the requested data of the DMA read request to a device buffer of the storage device. Initialization of the data-path is started after issuance of the DMA read request and is completed at an end of the estimated host turnaround time. The requested data is received from the host. The received requested data is transferred utilizing the data-path to the device buffer.

In one embodiment, a storage device includes a non-volatile memory and a device controller. The device controller includes a host interface, a data-path, a counter, a statistic collector, and a predictor engine means. The data-path includes a DMA module and a device buffer. The device controller operable to issue a DMA read request of a host memory to a host by the DMA module, count an actual host turnaround time of the DMA read request by the counter, collect one or more parameters related to the DMA read request by the statistic collector, estimate an estimated host turnaround time by the predictor engine means, and initialize the data-path of the storage device to transfer the requested data of the DMA read request to the device buffer. Initialization of the data-path is started after issuance of the DMA read request and is completed proximate at an end of the host turnaround time. The requested data is received from the host. The received requested data is transferred utilizing the data-path to the device buffer.

EXAMPLES

Example 1

The following TABLE 1 is an example of parameters collected by the statistic collector. The numerical values of the parameters depend on a variety of factors affecting the parameters of an individual system of a host and a storage device. Other configurations and other parameters can be collected by the statistic collector. The average turnaround time can be updated after a completed operation. TABLE 1 can represent a portion of a table collected by the statistic collector in which the full table extends across other parameters and other modes, such as other interface speeds, other number of lanes, other packets sizes, and other current outstanding commands.

TABLE 1

| Interface Speed | Number of Lanes | Packet Size | Current Outstanding Commands | Average Turnaround Time |
|---|---|---|---|---|
| . . . | . . . | . . . | . . . | . . . |
| Gen4 | 2 | 128 B | <16 | 0.9 μSec |
| Gen4 | 2 | 128 B | >15 & <32 | 2.0 μSec |

TABLE 1-continued

| Interface Speed | Number of Lanes | Packet Size | Current Outstanding Commands | Average Turnaround Time |
|---|---|---|---|---|
| Gen4 | 2 | 512 B | <16 | 2.3 μSec |
| Gen4 | 2 | 512 B | >15 & <32 | 6.0 μSec |
| Gen4 | 4 | 128 B | <16 | 0.5 μSec |
| Gen4 | 4 | 128 B | >15 & <32 | 1.4 μSec |
| Gen4 | 4 | 512 B | <16 | 1.2 μSec |
| Gen4 | 4 | 512 B | >15 & <32 | 3.3 μSec |
| . . . | . . . | . . . | . . . | . . . |

Example 2

ASIC simulations were done of methods 210, 220, 230 of FIGS. 2A-2C to compare the performance and the efficiency of the storage device. The storage device utilized an NVMe communications over a PCIe Gen4 host interface with a link of four lanes. The host turnaround time was about 1 μsec. The number of outstanding requests on the host interface was about 64. The packet size of the transaction of the DMA read request was 512B.

TABLE 2

| Method | Performance | Efficiency |
|---|---|---|
| Method 210 | 7.25 GBs | 80% |
| Method 220 | 6.74 GBs | 100% |
| Method 230 | 7.25 GBs | 96-100% |

Method 210 had high performance but low efficiency. Method 220 had low performance but high efficiency. Method 230 had high performance and high efficiency. The efficiency of method 230 was less than 100% in some instances due to completion of initialization of the data-path slightly before arrival of an initial data packet of requested data from a DMA read request.

While the foregoing is directed to embodiments of the present disclosure, other and further embodiments of the disclosure may be devised without departing from the basic scope thereof, and the scope thereof is determined by the claims that follow.

What is claimed is:

1. A method of accessing data by a storage device, comprising:
   issuing a direct memory access (DMA) read request of a host memory to a host;
   initializing a data-path of the storage device to transfer requested data of the DMA read request to a device buffer of the storage device;
   receiving the requested data from the host; and
   transferring the received requested data utilizing the data-path to the device buffer of the storage device, wherein initialization of the data-path is started after a first time interval from issuance of the DMA read request and prior a second time interval to receipt of an initial data packet of the received requested data.

2. The method of claim 1, further comprising encrypting the received requested data during the transfer of the received requested data to the device buffer.

3. The method of claim 1, wherein completion of initialization of the data-path is completed proximate to when the initial data packet of the received requested data is received.

4. The method of claim 1, wherein the data-path is locked for a time interval similar to a time internal for initialization of the data-path.

5. The method of claim 1, further comprising utilizing the data-path on a thread separate from the DMA request.

6. The method of claim 5, wherein the thread separate from the DMA request is selected from a group consisting of transferring data between a host memory buffer within the host memory and the storage device; performing security operations; and combinations thereof.

7. A method of accessing data by a storage device, comprising:
- issuing a direct memory access (DMA) read request of a host memory to a host;
- estimating a host turnaround time, the host turnaround time is a time interval between when the DMA read request is issued and when an initial data packet of requested data from the host from the DMA read request arrives to the storage device;
- initializing a data-path of the storage device to transfer the requested data of the DMA read request to a device buffer of the storage device, wherein initialization of the data-path is started after issuance of the DMA read request and wherein initialization is completed at an end of the estimated host turnaround time;
- receiving the requested data from the host; and
- transferring the received requested data utilizing the data-path to the device buffer.

8. The method of claim 7, further comprising encrypting the received requested data during the transfer of the received requested data to the device buffer.

9. The method of claim 7, wherein the initial data packet is received proximate the end of the estimated host turnaround time.

10. The method of claim 7, further comprising activating a counter measuring the time interval from issuance of the DMA read request and arrival of the initial data packet.

11. The method of claim 7, wherein the estimated host turnaround time is estimated by a predictor engine of a device controller of the storage device.

12. The method of claim 11, further comprising:
- collecting a parameter relating to the host turnaround time selected from a group consisting of an networking fabric structure, a host-storage device interface type, a host-storage device communications protocol type, a host interface speed, a number of lanes of a link between the host and the storage device, packets size of the DMA request, current stress across the link between the host and the storage device, an average host turnaround time of prior transactions, and combinations thereof,
- wherein the predictor engine estimates the host turnaround time based upon the collected parameter.

13. The method of claim 7, further comprising waiting to initialize the data-path after issuance of the DMA read requested based upon the estimated host turnaround time.

14. The method of claim 13, further comprising utilizing the data-path during the waiting to initialize the data-path on a thread separate from the DMA read request.

15. A storage device, comprising:
a non-volatile memory; and
a device controller comprising:
- a host interface;
- a data-path comprising a DMA module and a device buffer;
- a counter;
- a statistic collector; and
- a predictor engine means for activating the data-path proximate to receipt of data at the host interface in response to the DMA module accessing the host memory, the device controller operable to:
- issue a direct memory access (DMA) read request of a host memory to a host by the DMA module;
- count an actual host turnaround time of the DMA read request by the counter;
- collect one or more parameters related to the DMA read request by the statistic collector;
- estimate an estimated host turnaround time by the predictor engine means;
- initialize the data-path of the storage device to transfer the requested data of the DMA read request to the device buffer, wherein initialization of the data-path is started after issuance of the DMA read request is issued and completed at an end of the estimated host turnaround time;
- receive the requested data from the host; and
- transfer the received requested data utilizing the data-path to the device buffer.

16. The storage device of claim 15, wherein the data-path further comprises a security engine, the device controller operable to encrypt the received requested data during the transfer of the received requested data to the device buffer.

17. The storage device of claim 15, wherein the device controller is further operable to utilize the data-path in a separate thread between issuance of the DMA read request and initialization of the data-path to transfer data.

18. The storage device of claim 17, wherein the device controller is further operable to determine that the separate thread will complete prior to initialization of the data-path to transfer the requested data of the DMA read request.

19. The storage device of claim 15, wherein the statistic collector collects a parameter relating to the actual host turnaround time selected from a group consisting of an networking fabric structure, a host-storage device interface type, a host-storage device communications protocol type, a host interface speed, a number of lanes of a link between the host and the storage device, packets size of the DMA request, current stress across the link between the host and the storage device, an average host turnaround time of prior transactions, and combinations thereof.

20. The storage device of claim 19, wherein the statistic collector updates the average host turnaround time based upon the actual host turnaround time.

* * * * *